United States Patent [19]

Matsumura et al.

[11] Patent Number: 4,968,575
[45] Date of Patent: Nov. 6, 1990

[54] A TONER COMPOSITION COMPRISING A ROSIN-CONTAINING POLYESTER

[75] Inventors: Akira Matsumura, Suita; Tomiji Itou, Ogaki; Toshiyuki Kusuda, Ibaraki; Sadao Shigematsu, Amagasaki, all of Japan

[73] Assignee: Nippon Gohsei Kagaku Kogyo Kabushiki Kaisha, Osaká, Japan

[21] Appl. No.: 221,074

[22] Filed: Jul. 19, 1988

[30] Foreign Application Priority Data

Jul. 23, 1987 [JP] Japan .................. 62-184617
Feb. 8, 1988 [JP] Japan .................. 62-27205

[51] Int. Cl.$^5$ ............................................. G03G 9/087
[52] U.S. Cl. ...................................... 430/110; 430/109; 525/54.4; 527/604
[58] Field of Search ............... 430/107, 110, 904, 109; 525/54.4; 527/604

[56] References Cited

U.S. PATENT DOCUMENTS

| | | | |
|---|---|---|---|
| 2,555,042 | 5/1951 | Krumbhaar | 260/26 |
| 4,507,376 | 3/1985 | Makita et al. | 430/109 |
| 4,508,806 | 4/1985 | Oseta et al. | 430/109 |

FOREIGN PATENT DOCUMENTS

| | | | |
|---|---|---|---|
| 3501253 | 7/1985 | Fed. Rep. of Germany | 430/109 |
| 3738024 | 5/1988 | Fed. Rep. of Germany | 430/109 |
| 56-168660 | 12/1981 | Japan . | |
| 59-7960 | 1/1984 | Japan . | |
| 59-29256 | 2/1984 | Japan . | |
| 61-188545 | 8/1986 | Japan | 430/109 |
| 62-104834 | 5/1987 | Japan | 527/604 |
| 2077279A | 12/1981 | United Kingdom . | |
| 2207438 | 2/1989 | United Kingdom | 527/604 |

*Primary Examiner*—Roland E. Martin
*Attorney, Agent, or Firm*—Armstrong, Nikaido, Marmelstein, Kubovcik & Murray

[57] ABSTRACT

There are provided binder resins for use in toner compositions which comprise, as the main component thereof, a terminally blocked polyester in which the terminal hydroxyl groups of polyester polyol molecules are blocked by a rosin compound selected from the group consisting of rosin, hydrogenated rosin and disproportionated rosin and which has an acid value of not more than 4 KOH mg/g and a hydroxyl value of not more than 20 KOH mg/g as well as toner compositions comprising them in combination of a coloring agent and a charge control agent.

5 Claims, No Drawings

A TONER COMPOSITION COMPRISING A ROSIN-CONTAINING POLYESTER

BACKGROUND OF THE INVENTION

This invention relates to binder resins for use in the preparation of toners for developing electrostatic images formed in the process of electrophotography, electrostatography, electrostatic recording or the like. More particularly, the invention relates to binder resins usable in preparing positively chargeable toners as well as negatively chargeable toners.

Electrostatic images are generally developed with a toner, which occurs as a powder, to give toner images. These toner images are fixed either as they are or after transfer to a receiving paper sheet or the like.

Generally, toners are prepared by admixing a binder component and a coloring component, as necessary together with a charge control agent, melting the mixture with heating to achieve homogeneous admixture and comminuting the resultant mass to a desired particle size.

The performance characteristics of a toner much depend on the binder component. A binder resin having an acid value can give negatively chargeable toners, whereas a binder resin having an amine or quaternary ammonium salt group as introduced therein can give positively chargeable toners.

Various resins are known to be useful as binders for toner preparation. Recently, polyester binders have attracted much attention since they have high levels of negative chargeability and good low-temperature fixability, hence are suited for use in high-speed copying. Furthermore, they have good resistance to plasticizers. In other words, they will not cause prints or copies carrying images developed therewith to become indistinct when said prints or copies are placed in contact with a polyvinyl chloride sheet or film, for instance, and accordingly exposed to a plasticizer contained in said sheet or film.

Polyesters described as being useful as toner binder resins include, among others, the following:

(i) Japanese Kokai Tokkyo Koho No. 59(1984)-7960 discloses a thermally fixable dry toner containing non-linear, low melting-point polyesters with an acid value of 10–60 as obtained from components comprising (A) an alkyl-substituted dicarboxylic acid and/or an alkyl-substituted diol, (B) a polycarboxylic acid having three or more carboxyl groups and/or a polyol having three or more hydroxyl groups, (C) a dicarboxylic acid and (D) an etherified diphenol.

(ii) Japanese Patent Publication No. 52(1977)-25420 [Japanese Kokai Tokkyo Koho No. 47(1972)-12334]discloses a toner which comprises a polyester resin obtained from a dicarboxylic acid and a specific etherified diphenol and having a pour point lower than 110° C. and a softening point of not lower than about 60° C. The acid value of said resin is about 18–30, as described in the examples in the relevant specification.

(iii) Japanese Kokai Tokkyo Koho No. 59(1984)-29256 discloses a toner employing an amorphous polyester having an acid value of 10–100 as obtained by reacting an etherified diphenol propoxylated and/or ethoxylated with a propoxy group content of not less than 50% with a phthalic acid or acids containing up to 40 mole percent of an aromatic carboxylic acid having three or more carboxyl groups.

(iv) Japanese Kokai Tokkyo Koho No. 62(1987)-45622 discloses polyester resins for toner preparation which contain a nonvolatile monocarboxylic acid component, more specifically sulfobenzoic acid monoammonium salt, sulfobenzoic acid monosodium salt, cyclohexylaminocarbonylbenzoic acid, n-dodecylaminocarbonylbenzoic acid or the like, and have a glass transition point of 50° C. and a softening point of 90–170° C. Although no mention is made of the acid value and the hydroxyl value in the relevant specification, the product polyester must have a considerably great hydroxyl value since, in the examples described in said specification, the glycol component is used in considerable excess as compared with the acid component.

Among the above-mentioned polyester binder resins for toner preparation, those mentioned under (i), (ii) and (iii) are usable only for the preparation of negatively chargeable toners since they have a great acid value.

In the polyesters mentioned above under (iv), the excess hydroxyl groups are partly blocked by the benzoic acid type monocarboxylic acid. From the quantitative viewpoint, however, there must presumably exist a considerably large number of unblocked terminal hydroxyl groups. Investigations by the present inventors have revealed that hydroxyl-terminated polyesters have a difficult problem from the practical use viewpoint in that when positive charge control agents are added to toners based on such polyesters, only low levels of positive charge can be attained, although the addition of negative charge control agents can be expected to result in high levels of negative charging. Furthermore, toners based on the polyesters mentioned above under (iv) are not fully satisfactory in respect of low-temperature fixability and offset resistance. This offset phenomenon includes staining of the surface of the receiving sheet supplied next due to transfer of a part of toner to the heat roller and, further, staining of the back of the receiving sheet with that portion of toner further transferred to the pressure roller in contact with the heat roller under pressure.

Accordingly, it is a primary object of the invention to provide polyester binder resins which can be used in preparing both positively chargeable toners and negatively chargeable toners and can give toners having good low-temperature fixability and offset resistance.

SUMMARY OF THE INVENTION

The binder resins according to the invention which are to be used in preparing toners comprise, as a main component thereof, a terminally blocked polyester in which hydroxyl-terminated polyester polyol molecules are terminally blocked with a rosin compound selected from the group consisting of rosin, hydrogenated rosin and disproportionated rosin and which has an acid value of not more than 4 KOH mg/g and a hydroxyl value of not more than 20 KOH mg/g.

The toner compositions according to the invention comprise a binder resin comprising the above terminally blocked polyester as a main component thereof, a coloring agent and a charge control agent for positive or negative charging.

DETAILED DESCRIPTION OF THE INVENTION

The polyester polyols can be obtained by reacting a polybasic acid component and a polyhydric alcohol component.

As the polybasic acid component, there may be mentioned terephthalic acid, isophthalic acid, phthalic acid, malonic acid, dimethylmalonic acid, succinic acid, glutaric acid, adipic acid, trimethyladipic acid, pimelic acid, 2,2-dimethylglutaric acid, azelaic acid, sebacic acid, fumaric acid, maleic acid, itaconic acid, 1,3-cyclopentanedicarboxylic acid, 1,2-cyclohexanedicarboxylic acid, 1,4-cyclohexanedicarboxylic acid, 2,5-norbornanedicarboxylic acid, 1,4-naphthalic acid, diphenic acid, 4,4'-oxydibenzoic acid, diglycolic acid, thiodipropionic acid, 2,5-naphthalenedicarboxylic acid and the like. These polybasic acids may be in the form of acid anhydrides, esters, chlorides, etc.

Polybasic carboxylic acids having three or more carboxyl groups, such as trimellitic acid, trimellitic anhydride, pyromellitic acid, pyromellitic anhydride, 4-methylcyclohexene-1,2,3-tricarboxylic anhydride, trimesic acid, 5-(2,5-dioxotetrahydrofurfuryl)-3-methyl-3-cyclohexene-1,2-dicarboxylic anhydride, may be used in small amounts in combination with the aforementioned dicarboxylic acids.

As the polyhydric alcohol component, there may be mentioned ethylene glycol, diethylene glycol, propylene glycol, 1,3-propanediol, 1,3-butanediol, 1,4-butanediol, 1,5-pentanediol, 1,6-hexanediol, 1,7-heptanediol, 1,8-octanediol, 1,9-nonanediol, 1,10-decanediol, 2,4-dimethyl-2-ethylhexane-1,3-diol, 2,2-dimethyl-1,3-propanediol (neopentyl glycol), 2-ethyl-2-butyl-1,3-propanediol, 2-ethyl-2-isobutyl-1,3-propanediol, 3-methyl-1,5-pentanediol, 2,2,4-trimethyl-1,6-hexanediol, 1,2-cyclohexanedimethanol, 1,3-cyclohexanedimethanol, 1,4-cyclohexanedimethanol, 2,2,4,4-tetramethyl-1,3-cyclobutanediol, 4,4'-thiodiphenol, 4,4'-methylenediphenol, 4,4'-(2-norbornylidene)diphenol, 4,4'-dihydroxybiphenyl, o-, m- and p-dihydroxybenzene, 4,4'-isopropylidenediphenol, 4,4'-isopropylidenebis(2,6-dichlorophenol), 2,5-naphthalenediol, p-xylylenediol, cyclopentane-1,2-diol, cyclohexane-1,2-diol, cyclohexane-1,4-diol, and etherified diphenols such as bisphenol A-alkylene oxide adducts, and so forth. A small amount of a polyhydric alcohol having three or more hydroxyl groups may be used in combination, as the case may be.

As the polyhydric alcohol having three or more hydroxyl groups, there may be mentioned glycerol, trimethylolpropane, 1,2,6-hexanetriol, trimethylolethane, pentaerythritol, dipentaerythritol, tripentaerythritol and sorbitol, among others.

Rosin is a substance containing abietic acid as the main component and further containing neoabietic acid, dihydroabietic acid, tetrahydroabietic acid, d-pimaric acid, iso-d-pimaric acid, dehydroabietic acid, and so on. Hydrogenated rosin is the product of hydrogenation of rosin. Disproportionated rosin is a mixture containing dehydroabietic acid and dihydroabietic acid as main components thereof as derived from rosin containing abietic acid as the main component thereof by heating at a high temperature in the presence of a noble metal catalyst or a halogen catalyst for eliminating the unstable conjugated double bond in the molecule.

In the practice of the invention, the use of hydrogenated rosin, which has better storage stability, is preferred to the use of rosin. In cases where a quaternary ammonium salt is used as the charge control agent to be mentioned later herein, the use of disproportionated rosin is most suited.

For the preparation of those polyesters in which the terminal hydroxyl groups of polyester polyol molecules are blocked by such rosin compound, the following two typical processes can be employed:

(a) A reactor vessel is charged with the polybasic acid and the polyhydric alcohol (the latter being in excess), together with the rosin compound and the esterification reaction is performed in the conventional manner. The subsequent polycondensation under high vacuum gives the desired, terminally blocked polyester.

(b) A reactor vessel is charged with the polybasic acid and the polyhydric alcohol (the latter being in excess) and the polyesterification reaction is carried out in the conventional manner. Then, the rosin compound is added and allowed to react with excess hydroxyl groups. If necessary, a monohydric alcohol is then added and allowed to react with the excess rosin compound. The excess additional material portion is then removed under medium vacuum, whereupon the desired, terminally blocked polyester is obtained.

In carrying the reaction in the above typical processes (a) and (b), the proportions of the reactant components and the reaction conditions should be adjusted so that the product, namely terminally blocked polyester, can have an acid value of not more than 4 KOH mg/g and a hydroxyl value of not more that 20 KOH mg/g. If one or both of the acid value and hydroxyl value are above the upper limits mentioned above, toners having expected properties cannot be obtained. It is particularly preferable that the acid value should be not more than 3 KOH mg/g, more preferably not more than 2 KOH mg/g, and the hydroxyl value should be not more than 15 KOH mg/g, more preferably not more than 12 KOH mg/g.

Toner preparation can be achieved by incorporating, as necessary, a flowability improving agent, a release agent and a plasticizer into a mixture of the above-mentioned blocked polyester, a coloring agent and a charge control agent, melting the mixture for attaining homogeneity, and comminuting the cooled mixture to a desired particle size. The above terminally blocked polyester may be used in combination with one or more other polyester and/or other toner binder resin unless it is unfit for the purpose of the invention.

As the coloring agent, there may be mentioned, for example, carbon black, nigrosine dyes, aniline black, Calco Oil Blue, chrome yellow, Ultramarine Blue, du Pont Oil Red, quinoline yellow, methylene blue chloride, phthalocyanine blue, malachite green oxalate, lampblack and rose bengal. Among them, carbon black is of particular importance.

Magnetic toners can be obtained by incorporating a magnetic or magnetizable material, for example a fine powder of a metal, such as iron, manganese, nickel, cobalt or chromium, ferrite or permalloy, into the toner.

The charge control agent is an agent for stabilizing the positive or negative charge on the toner as generated for image development. As the positive charge control agent, there may be mentioned, for example, electron-donor dyes (nigrosine dyes, etc.), alkoxylated amines and quaternary ammonium salts. As the negative charge control agent, there may be mentioned electron-acceptor dyes (monoazo dye metal complexes, etc.) and electron-accepting organic complexes, among others.

Among famous, commercially available charge control agents, there may be mentioned those products of Orient Kagaku Kogyo Kabushiki Kaisha, namely Bontron N series ones (for positive charge), Bontron P series ones (for positive charge), Bontron S series ones (for negative charge) and Bontron E series ones (for negative charge).

The binder resins according to the invention which are to be used in preparing toners are substantially neutral resins since they have a low acid value and a low hydroxyl value as a result of blocking of all or most of the terminal hydroxyl groups of polyester polyol molecules by said rosin compound.

Therefore, in spite of the fact that they are polyester-based resins, the binder resins according to the invention have a characteristic feature in that when a positive charge control agent is added thereto together with a coloring agent, the resultant toners are positively chargeable and when a negative charge control agent is added, the resultant toners are negatively chargeable.

Furthermore, the absolute value of attainable charge, whether positive or negative, is high and, therefore, the toners based on the binder resins according to the invention have sufficient practicability.

Moreover, since the terminals are blocked with a rosin compound, the storage stability is improved and both the low-temperature fixation and anti-offset properties are assured.

EXAMPLES

The following examples are further illustrative of the toner binder resin according to the present invention. Hereinafter, "part(s)" and "%" are on the weight basis.

[Binder resin production]

EXAMPLE 1

A flask equipped with a packed column was charged with 0.5 mole of terephthalic acid, 0.4 mole of isophthalic acid, 0.85 mole of ethylene glycol, 0.5 mole of bisphenol A-ethylene oxide adduct, 0.1 mole of glycerol and 0.2 mole of hydrogenated rosin, and these reactants were allowed to react at 180–250° C. with stirring in the presence of n-butyltin oxide as a catalyst.

When the formation of water as a distillate had ceased, antimony trioxide was added as a polycondensation catalyst, the packed column was removed, and the polycondensation reaction was allowed to proceed under reduced pressure (1 mmHg). When no more glycol distillate was formed, the reaction procedure was terminated.

EXAMPLE 2

A flask equipped with a packed column was charged with 0.5 mole of terephthalic acid, 0.5 mole of isophthalic acid, 0.6 mole of ethylene glycol and 0.5 mole of bisphenol A-ethylene oxide adduct, and these reactants were allowed to react at 180–250° C. with stirring in the presence of n-butyltin oxide as a catalyst.

When the formation of water as a distillate had ceased, 2 moles of hydrogenated rosin was added. Then, the reaction was allowed to proceed for 1 hour. Thereafter, 0.3 mole of benzyl alcohol was further added and the reaction was continued for an additional hour. The packed column was then removed, the unreacted portions of the reactants were distilled off under reduced pressure (100 mmHg), and the reaction was thus finished.

EXAMPLE 3

The reaction procedure of Example 1 was followed except that 0.1 mole of rosin was used in lieu of 0.2 mole of hydrogenated rosin and that glycerol was not charged.

EXAMPLE 4

A disproportionated rosin (dihydroabietic acid and dihydroabietic acid)-modified polyester was produced by the procedure of Example 1. The reactants charged were as follows:

| | |
|---|---|
| Terephthalic acid | 0.9 mole |
| Ethylene glycol | 0.85 mole |
| Bisphenol A-ethylene oxide adduct | 0.5 mole |
| Glycerol | 0.1 mole |
| Disproportionated rosin | 0.2 mole |

Comparative Example 1

The reaction procedure of Example 1 was followed with the following reactants: 0.5 mole of terephthalic acid, 0.5 mole of isophthalic acid, 1.0 mole of ethylene glycol and 0.5 mole of bisphenol A-ethylene oxide adduct.

Comparative Example 2

A flask equipped with a packed column was charged with 0.5 mole of terephthalic acid, 0.5 mole of isophthalic acid, 0.55 mole of ethylene glycol and 0.5 mole of bisphenol A-ethylene oxide adduct, and the reaction was allowed to proceed at 18–250° C. with stirring in the presence of n-butyltin oxide as a catalyst.

After cessation of the formation of water as a distillate, the reaction procedure was continued for a further hour. Then, the packed column was removed, the free-form reactant residues were distilled off under reduced pressure (100 mmHg), and the reaction was thus finished.

Comparative Example 3

The reaction procedure of Example 1 was followed with the following charge composition: 0.5 mole of terephthalic acid, 0.5 mole of isophthalic acid, 0.8 mole of ethylene glycol and 0.5 mole of bisphenol A-ethylene oxide adduct.

Comparative Example 4

The reaction procedure of Example 1 was followed with the following charge composition: 0.5 mole of terephthalic acid, 0.4 mole of isophthalic acid, 1.0 mole of ethylene glycol, 0.5 mole of bisphenol A-ethylene oxide adduct and 0.2 mole of benzoic acid.

Typical characteristics of the resins obtained in the above examples, namely Examples 1–4 and Comparative Examples 1–4 are shown below in Table 1.

TABLE 1

| | Number-average molecular | Glass transition temperature | Acid value (KOH mg/g) | Hydroxyl value (KOH mg/g) |
|---|---|---|---|---|
| Example 1 | 2,800 | 63° C. | 0.5 | 9.0 |
| Example 2 | 3,200 | 60° C. | 1.5 | 5.5 |
| Example 3 | 4,000 | 65° C. | 0.5 | 8.0 |
| Exmaple 4 | 2,700 | 65° C. | 0.5 | 10.0 |
| Comparative Example 1 | 3,000 | 61° C. | 0.5 | 36.0 |
| Comparative Example 2 | 3,500 | 61° C. | 12.0 | 18.0 |
| Comparative Example 3 | 15,000 | 63° C. | 0.5 | 7.0 |
| Comparative Example 4 | 2,700 | 61° C. | 0.5 | 6.0 |

Bontron N-01 (azine compound), a product of Orient Kagaku Kogyo, was prepared as a positive charge control agent, and Bontron S-34 (metal-containing compound), a product of Orient Kagaku Kogyo as a negative charge control agent.

88 parts of a polyester obtained in the above manner, 10 parts of carbon black (Mitsubishi Kasei Corporation's Carbon Black No. 44) and 1 part of positive or negative charge control agent, each in a powder form, were mixed together. The mixture was fed a double-screw kneader (Ikegai Tekko model PCM30) and kneaded there at a temperature between 100 and 160° C. at which the melt viscosity of said mixture is 10,000 to 50,000 poises, and 100 revolutions per minute, then cooled by bringing it into contact with a chill roll, and roughly crushed to a particle size of not more than 0.8 mm in a hammer mill. The powder obtained was divided more finely at a feed rate of 200 g/hr using a supersonic jet pulverizer (Nippon Pneumatic Kogyo model LABO JET) fitted with a classifier. After classification by means of a whirl-wind classifier, there was obtained a toner mass having an average particle size of 5–15 μ.

The toners thus obtained were evaluated for stability upon standing at 50° C., chargeability, fixability and tendency toward offset by the following methods:

Stability at 50° C.

A 15-g portion of each toner prepared as described above was placed in a 70-cc wide-mouthed glass bottle. The bottle was hermetically stoppered and allowed to stand in a constant-temperature vessel maintained at 50 ±0.5° C. The bottle was then taken out and the contents were evaluated by the eye as to whether the toner retained flowability.

Electric charge

In a wide-mouthed glass bottle, there were placed 5 parts of the toner obtained in the above manner and 95 parts of iron powder (Nippon Teppun's TEFV-200/300). The mixture was stirred for 3 minutes using a rolling mixer (Thermal Kagaku Sangyo Kabushiki Kaisha) and the charge was measured using a blow-off powder charge measuring apparatus (Toshiba Chemical model TB-200).

Testing for fixability and tendency toward offset

An image produced in an electrostatic copier provided with a selenium photoreceptor drum was developed with a mixture of 5 parts of the negative toner obtained in the above manner and 95 parts of an iron powder (Nippon Teppun's EFV-150/250). The toner image was transferred to a plain paper sheet and fixed by means of a heat roll coated with a fluororesin at a peripheral velocity of 280 mm/sec. The temperature of the heat roll was varied and the toner was evaluated for fixability on paper and tendency toward offset (adhesion of the toner to the heat roll).

The positively chargeable toners obtained above were also tested in the same manner. The peripheral velocity was 160 mm/sec in this case.

Test results

The results of testing for stability at 50° C. and chargeability are shown below in Table 2, and the results of testing for fixability and tendency toward offset are shown below in Table 3.

TABLE 2

|  | Charge control agent | Stability at 50° C. | Electric charge (μe/g) |
| --- | --- | --- | --- |
| Example 1 | Positive charge | No change | +30 |
|  | Negative charge | No change | −41 |
| Example 2 | Positive charge | No change | +22 |
|  | Negative charge | No change | −38 |
| Example 3 | Positive charge | No change | +32 |
|  | Negative charge | No change | −44 |
| Example 4 | Positive charge | No change | +32 |
|  | Negative charge | No change | −43 |
| Comparative Example 1 | Positive charge | No change | +5 |
|  | Negative charge | No change | −35 |
| Comparative Example 2 | Positive charge | No change | −2.5 |
|  | Negative charge | No change | −40 |
| Comparative Example 3 | Positive charge | * | * |
|  | Negative charge | * | * |
| Comparative Example 4 | Positive charge | No change | +33 |
|  | Negative charge | No change | −44 |

*Not determined because the resin could not be finely divided.

TABLE 3

|  | Negative charge toner | | | Positive charge toner | |
| --- | --- | --- | --- | --- | --- |
|  | Minimum fixation temperature | Minimum offset temperature | High-temperature offset | Minimum fixation temperature | Minimum offset temperature |
| Example 1 | 160° C. | 150° C. | ≧200° C. | 130° C. | 135° C. |
| Example 2 | 165° C. | 155° C. | ≧200° C. | 135° C. | 140° C. |
| Example 3 | 170° C. | 160° C. | ≧200° C. | 140° C. | 145° C. |
| Example 4 | 160° C. | 150° C. | ≧200° C. | 130° C. | 135° C. |
| Comparative Example 1 | 160° C. | 150° C. | ≧200° C. | No image | No image |
| Comparative Example 2 | 160° C. | 155° C. | ≧200° C. | No image | No image |
| Comparative Example 4 | 175° C. | 165° C. | 200° C. | 150° C. | 145° C. |

From the data give in Table 2 and Table 3, the following conclusions can be drawn:

The binder resins of Comparative Examples 1 and 2 can be used for the preparation of negatively chargeable toners but cannot be used in positively chargeable toners. The resin of Comparative Example 3 is resistant to comminution itself, hence cannot be used as a binder resin for toner preparation. The binder resin of Comparative Example 4 is insufficient in low-temperature fixability offset resistance although it can be used in preparing positively chargeable toners as well as negatively chargeable toners.

On the contrary, the binder resins of Examples 1–4 can be used for the preparation of positively chargeable toners as well as negatively chargeable toners. Furthermore, they have good low-temperature fixability and offset resistance.

[Binder resin production]

Example 5

A flask equipped with a packed column was charged with 0.9 mole of terephthalic acid, 0.85 mole of ethylene glycol, 0.5 mole of bisphenol A-ethylene oxide adduct, 0.1 mole of glycerol and 0.2 mole of disproportionated rosin (Harima Kagaku Kogyo's Haritack GX), and the reactants were stirred at 180–250° C. in the presence of n-butyltin oxide as a catalyst.

When the formation of water as a distillate had ceased, antimony trioxide was added as a polycondensation catalyst and the packed column was removed. Polycondensation was then effected with glycol removal under reduced pressure (1 mmHg). When no more glycol was distilled off, the reaction procedure was terminated.

Example 6

A flask equipped with a packed column was charged with 0.9 mole of terephthalic acid, 0.6 mole of ethylene glycol and 0.5 mole of bisphenol A-ethylene oxide adduct, and the resultant mixture was heated at 180–250° C. with stirring in the presence of n-butyltin oxide as a catalyst.

When the formation of water as a distillate had ceased, 2 moles of disproportionated rosin was added. The reaction was allowed to proceed continuedly for an additional hour and, then, 0.3 mole of benzyl alcohol was further added. The reaction was continued for a further hour. The packed column was then removed, the unreacted matter was distilled off under reduced pressure (100 mmHg), and the reaction procedure was terminated.

Example 7 and Comparative Example 5

The reaction procedure of Example 5 was followed using hydrogenated rosin (Rika-Hercules' Staybelite resin) (Example 7) or natural rosin (Comparative Example 5) in lieu of disproportionated rosin.

Typical characteristics of the resins obtained in the above-mentioned Examples 5–7 and Comparative Example 5 are shown below in Table 4.

TABLE 4

|  | Number-average molecular | Glass transition temperature | Acid value (KOH mg/g) | Hydroxyl value (KOH mg/g) |
| --- | --- | --- | --- | --- |
| Example 5 | 3,200 | 65° C. | 0.5 | 3.0 |
| Example 6 | 3,000 | 63° C. | 1.5 | 8.5 |
| Example 7 | 3,200 | 62° C. | 0.5 | 3.5 |
| Comparative Example 5 | 3,100 | 64° C. | 0.5 | 3.0 |

[Toner preparation and evaluation]

The following quaternary ammonium salts were prepared for use as positive charge control agents:

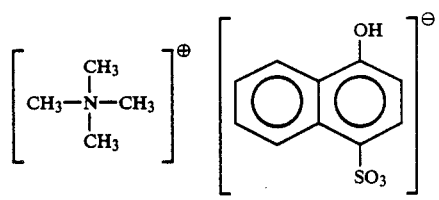

(I)

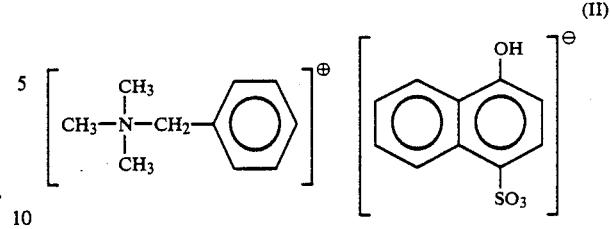

(II)

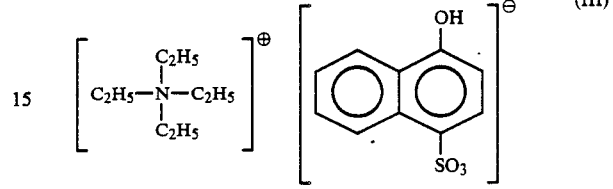

(III)

90 parts of a polyester resin obtained in the above manner, 8 parts of carbon black (Mitsubishi Kasei Corporation's Carbon Black No. 44) and 2 parts of charge control agent, each in a powder form, were mixed together. The mixture was fed to a double-screw kneader (Ikegai Tekko model PCM30) and kneaded there at a temperature between 100 and 160° C. at which the melt viscosity of said mixture is 10,000 to 50,000 poises, and 100 revolutions per minute, then cooled by bringing it into contact with a chill roll, and roughly crushed to a particle size of not more than 0.8 mm in a hammer mill. The powder obtained was divided more finely at a feed rate of 200 g/hr using a supersonic jet pulverizer (Nippon Pneumatic Kogyo model LABO JET) fitted with a classifier. After classification by means of a whirl-wind classifier, there was obtained a toner composition having an average particle size of 5–15 μ.

The toner compositions thus obtained were evaluated for stability at 50° C. and chargeability by the respective methods mentioned hereinabove.

The results obtained are shown below in Table 5.

TABLE 5

|  | Charge control agent | Stability at 50° C. | Electric charge (μe/g) |
| --- | --- | --- | --- |
| Example 5 | (I) | No change | 21.8 |
|  | (II) |  | 22.6 |
|  | (III) |  | 20.9 |
| Example 6 | (I) | No change | 24.6 |
|  | (II) |  | 25.4 |
|  | (III) |  | 23.3 |
| Example 7 | (I) | No change | 15.0 |
|  | (II) |  | 16.3 |
|  | (III) |  | 14.9 |
| Comparative Example 5 | (I) | No change | 11.9 |
|  | (II) |  | 12.0 |
|  | (III) |  | 11.7 |

The data given in Table 5 indicate that those terminally blocked polyesters prepared by using disproportionated rosin are most suited as binder resins for use in toners containing a quaternary ammonium salt as the charge control agent.

What is claimed is:

1. A toner composition which comprises a binder resin comprising, as the main component thereof, a terminally blocked polyester in which the terminal hydroxyl groups of polyester polyol molecules are blocked by a rosin compound selected from the group consisting of rosin, hydrogenated rosin and disporportionated rosin and which has an acid value of not more than 4 mg/g KOH and a hydroxyl value of not more than 20 mg/g KOH, a coloring agent and a charge control agent for positive or negative charge.

2. A toner composition as claimed in claim 1, wherein the binder resin accounts for 80–90% by weight, the coloring agent for 5–15% by weight and the charge control agent for 0.5–10% by weight, based on the total amount (100% by weight) of the binder resin, coloring agent and charge control agent.

3. The toner composition as claimed in claim 1, wherein the rosin compound is rosin.

4. The toner composition as claimed in claim 1, wherein the rosin compound is hydrogenated rosin.

5. The toner composition as claimed in claim 1, wherein the rosin compound is disproportionated rosin.

* * * * *